United States Patent
Krausche et al.

(10) Patent No.: US 11,149,665 B2
(45) Date of Patent: Oct. 19, 2021

(54) METHOD AND SYSTEM FOR CONTROLLING ENGINE DERATING

(71) Applicant: Volvo Truck Corporation, Gothenburg (SE)

(72) Inventors: Sebastian Krausche, Höllviken (SE); Martin Bauer, Anderslöv (SE)

(73) Assignee: Volvo Truck Corporation, Gothenburg (SE)

( * ) Notice: Subject to any disclaimer, the term of this patent is extended or adjusted under 35 U.S.C. 154(b) by 32 days.

(21) Appl. No.: 16/616,758

(22) PCT Filed: May 31, 2017

(86) PCT No.: PCT/EP2017/063148
§ 371 (c)(1),
(2) Date: Nov. 25, 2019

(87) PCT Pub. No.: WO2018/219448
PCT Pub. Date: Dec. 6, 2018

(65) Prior Publication Data
US 2020/0173384 A1 Jun. 4, 2020

(51) Int. Cl.
*F02D 41/00* (2006.01)
*F02B 37/24* (2006.01)
(Continued)

(52) U.S. Cl.
CPC .......... *F02D 41/0007* (2013.01); *F02B 37/24* (2013.01); *F02D 41/18* (2013.01);
(Continued)

(58) Field of Classification Search
CPC .......... F02B 2037/122; F02B 2037/125; F02B 37/24; F02D 2200/703; F02D 41/0007;
(Continued)

(56) References Cited

U.S. PATENT DOCUMENTS 5,025,629 A * 6/1991 Woollenweber .......... F02C 6/12
60/600
5,560,208 A 10/1996 Halimi et al.
(Continued)

FOREIGN PATENT DOCUMENTS

EP 1452742 A1 9/2004
EP 1482128 A1 12/2004
(Continued)

OTHER PUBLICATIONS

International Search Report and Written Opinion for International Patent Application No. PCT/EP2017/063148, dated Feb. 13, 2018, 12 pages.
(Continued)

*Primary Examiner* — Jesse S Bogue
(74) *Attorney, Agent, or Firm* — Withrow & Terranova, PLLC

(57) ABSTRACT

The invention relates to a method of controlling engine derating of an internal combustion engine (10) being provided with a turbocharger (110) and a variable inlet guide vanes assembly (130) arranged upstream a compressor (120) of the turbocharger (110). The method comprises determining a current operational condition requiring engine derating, detecting a current operational condition of the compressor (120), and controlling the position of the variable inlet guide vanes assembly (130) based on the detected operational condition of the compressor (120).

11 Claims, 5 Drawing Sheets

(51) Int. Cl.
*F02D 41/18* (2006.01)
*F04D 27/02* (2006.01)

(52) U.S. Cl.
CPC ...... *F04D 27/0246* (2013.01); *F05D 2220/40* (2013.01); *F05D 2250/51* (2013.01); *F05D 2270/301* (2013.01); *F05D 2270/303* (2013.01)

(58) Field of Classification Search
CPC .. F02D 41/18; F04D 27/0246; F05D 2220/40; F05D 2250/51; F05D 2270/301; F05D 2270/303; Y02T 10/12
See application file for complete search history.

(56) References Cited

U.S. PATENT DOCUMENTS

| | | | | |
|---|---|---|---|---|
| 6,079,211 A * | 6/2000 | Woollenweber | ...... | F02B 37/025 60/612 |
| 6,256,993 B1 * | 7/2001 | Halimi | ...... | F02B 39/10 60/608 |
| 6,298,718 B1 * | 10/2001 | Wang | ...... | F02D 41/22 73/114.01 |
| 7,669,417 B2 * | 3/2010 | Smith | ...... | F02B 29/0443 60/599 |
| 8,375,714 B2 * | 2/2013 | Gokhale | ...... | F02B 37/225 60/611 |
| 9,194,284 B2 * | 11/2015 | Gratton | ...... | F02B 47/08 |
| 2007/0289302 A1 | 12/2007 | Funke et al. | | |
| 2009/0013687 A1 * | 1/2009 | Swenson | ...... | F02D 23/00 60/600 |
| 2009/0249783 A1 * | 10/2009 | Gokhale | ...... | F02D 41/005 60/602 |
| 2009/0301085 A1 | 12/2009 | Heyes | | |
| 2015/0143882 A1 * | 5/2015 | Nakano | ...... | F02B 39/16 73/112.05 |

FOREIGN PATENT DOCUMENTS

| | | |
|---|---|---|
| EP | 1772608 A1 | 4/2007 |
| FR | 2915237 A1 | 10/2008 |
| JP | S62253924 A | 11/1987 |

OTHER PUBLICATIONS

International Preliminary Report on Patentability for International Patent Application No. PCT/EP2017/063148, dated Sep. 13, 2019, 7 pages.

* cited by examiner

METHOD AND SYSTEM FOR CONTROLLING ENGINE DERATING

This application is a 35 USC 371 national phase filing of International Application No. PCT/EP2017/063148, filed May 31, 2017, the disclosure of which is incorporated herein by reference in its entirety.

TECHNICAL FIELD

The invention relates to a method for controlling engine derating, and especially for use with a vehicle system having an internal combustion engine and a turbocharger unit connected thereto.

The invention can be applied in heavy-duty vehicles, such as trucks, buses and construction equipment. Although the invention will be described with respect to a truck, the invention is not restricted to this particular vehicle, but may also be used in other applications.

BACKGROUND

Heavy-duty vehicles, such as trucks, are typically driven by a diesel engine having a turbocharger connected thereto. In developing improved vehicles of this type there is a constant increase of more stringent requirements for fuel efficiency, emissions, and power/torque. Especially for vehicle systems including a turbocharger these requirements normally drives towards a vehicle system being highly optimized with relatively low margin to its design limits. Also, the transient response is normally compromised with.

The above prerequisites often result in that the required power derate is rather high in order to manage the design limits of the turbocharger as well as on the entire engine. Typically this problem occurs at high altitude driving, and pronounced disadvantages are associated with fix geometry turbocharger units, as these allow for only limited possibilities to adjust the turbo characteristics for reducing the derate.

Therefore it would be desirable to provide a method and vehicle system capable of minimizing engine derating, especially for commercial vehicles.

SUMMARY

An object of the invention is to provide a method and vehicle system allowing for changing compressor characteristics in order to control engine derating.

According to a first aspect of the invention, the object is achieved by a method. According to a second aspect of the invention, the object is achieved by a vehicle system.

By controlling the position of a variable inlet guide vanes assembly based on the detected operational condition of the compressor it is possible to improve the compressor performance in order to reduce engine derating.

According to an embodiment, determining the current operational condition requiring engine derating is performed by detecting high altitude driving. High altitude driving is a specific condition in which compressor speed and exhaust temperature have a limiting impact on the engine power; by monitoring this specific condition it is possible to adjust the vehicle system characteristics whereby substantial improvement of engine performance is accomplished.

In an embodiment the detected current operational condition of the compressor is indicative of high engine speed and high engine power. Controlling the position of the variable inlet guide vanes assembly may thereby be performed by determining an estimated negative inclination angle of the vanes of the variable inlet guide vanes assembly, and changing the inclination of the vanes to the determined negative inclination angle. The compressor speed may thereby be lowered, which otherwise often is a limiting factor at high engine speed.

In an embodiment the estimated negative inclination angle of the vanes is between 0 and 45°, preferably between 0 and 20°. Hence the pre-whirl of the incoming air is adjusted to change compressor characteristics.

Preferably, changing the inclination angle of the vanes will also change the flow inlet angle of the compressor. In some embodiments the inclination angle of the vanes is controlled to be within ±45°, while in other embodiment the flow inlet angle of the compressor is controlled (by changing the inclination angle of the vanes) to be within ±45°.

In an embodiment the sequence of detecting a current operational condition of the compressor and controlling the position of the variable inlet guide vanes assembly are repeated. By doing so it is possible to continuously update the compressor characteristics depending on the actual operating condition.

In an embodiment the detected current operational condition of the compressor is indicative of high engine torque at lower engine speeds. Controlling the position of the variable inlet guide vanes assembly may thereby be performed by determining an estimated positive inclination angle of the vanes of the variable inlet guide vanes assembly, and changing the inclination of the vanes to the determined positive inclination angle. The compressor efficiency may thereby be increased, thereby lowering the exhaust gas temperature which otherwise often is a limiting factor at high engine torque In an embodiment the estimated positive inclination angle of the vanes is between 0 and 45°, preferably between 0 and 20°. Hence the pre-whirl of the incoming air is adjusted to change compressor characteristics.

In an embodiment the sequence of detecting a current operational condition of the compressor and controlling the position of the variable inlet guide vanes assembly are repeated. By doing so it is possible to continuously update the compressor characteristics depending on the actual operating condition.

In an embodiment detecting a current operational condition of the compressor is performed by determining the current corrected mass flow through the compressor and the current pressure ratio across the compressor, and determining a current operating point in a compressor map. Compressor characteristics may thus be determined in a reliable and robust manner.

According to a further aspect a computer program comprising program code means for performing the steps of the method according to the first aspect is provided, when said program is run on a computer.

According to a yet further aspect a computer readable medium is provided, carrying a computer program comprising program code means for performing the steps of the method according to the first aspect when said program product is run on a computer.

According to a second aspect a vehicle system is provided. The vehicle system comprises an internal combustion engine, a turbocharger, a variable inlet guide vanes assembly arranged upstream a compressor of the turbocharger, and a control unit being connected to the variable inlet guide vanes assembly. The control unit is configured to determine a current operational condition requiring engine derating, detect a current operational condition of the compressor, and to control the position of the variable inlet guide vanes assembly based on the detected operational condition of the compressor.

In an embodiment the control unit is configured to determine the current operational condition requiring engine derating by detecting high altitude driving.

The detected current operational condition of the compressor may be indicative of high engine speed.

In an embodiment the control unit is configured to control the position of the variable inlet guide vanes assembly by determine an estimated negative inclination angle of the vanes of the variable inlet guide vanes assembly, and change the inclination of the vanes to the determined negative inclination angle. The estimated negative inclination angle of the vanes may be between 0 and 45°, preferably between 0 and 20°.

In an embodiment the control unit is configured to repeat detecting a current operational condition of the compressor and controlling the position of the variable inlet guide vanes assembly.

The detected current operational condition of the compressor may be indicative of high engine speed.

In an embodiment the control unit is configured to control the position of the variable inlet guide vanes assembly by determine an estimated positive inclination angle of the vanes of the variable inlet guide vanes assembly, and change the inclination of the vanes to the determined positive inclination angle. The estimated positive inclination angle of the vanes is between 0 and 45°, preferably between 0 and 20°.

In an embodiment the control unit is configured to repeat detecting a current operational condition of the compressor and controlling the position of the variable inlet guide vanes assembly.

In an embodiment the control unit is configured to perform the steps of the method according to the first aspect.

According to a yet further aspect, a vehicle is provided. The vehicle comprises a vehicle system according to the second aspect presented above.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
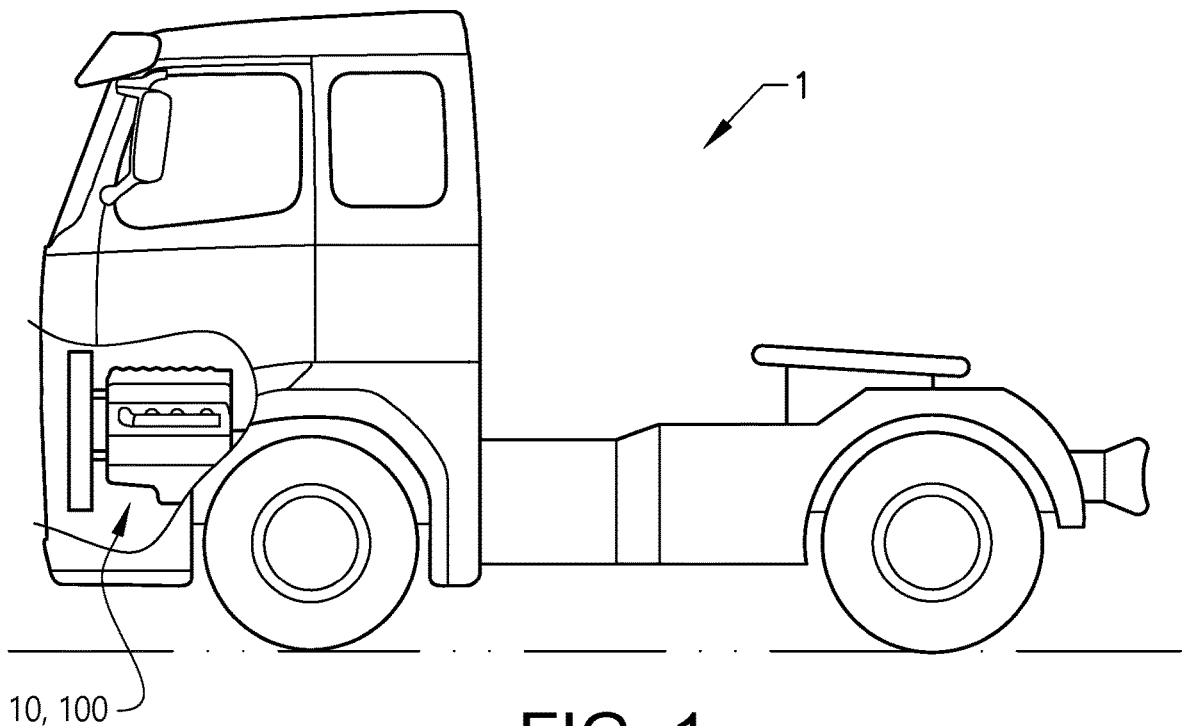
FIG. 1 is a schematic view of a truck being equipped with a vehicle system according to an embodiment.

Starting in FIG. 1 a vehicle 1 is shown, here in the form of a truck. The truck 1 is driven by means of an internal combustion engine 10 forming part of a vehicle system 100 which is shown in further details in FIG. 2.

Figure 2:
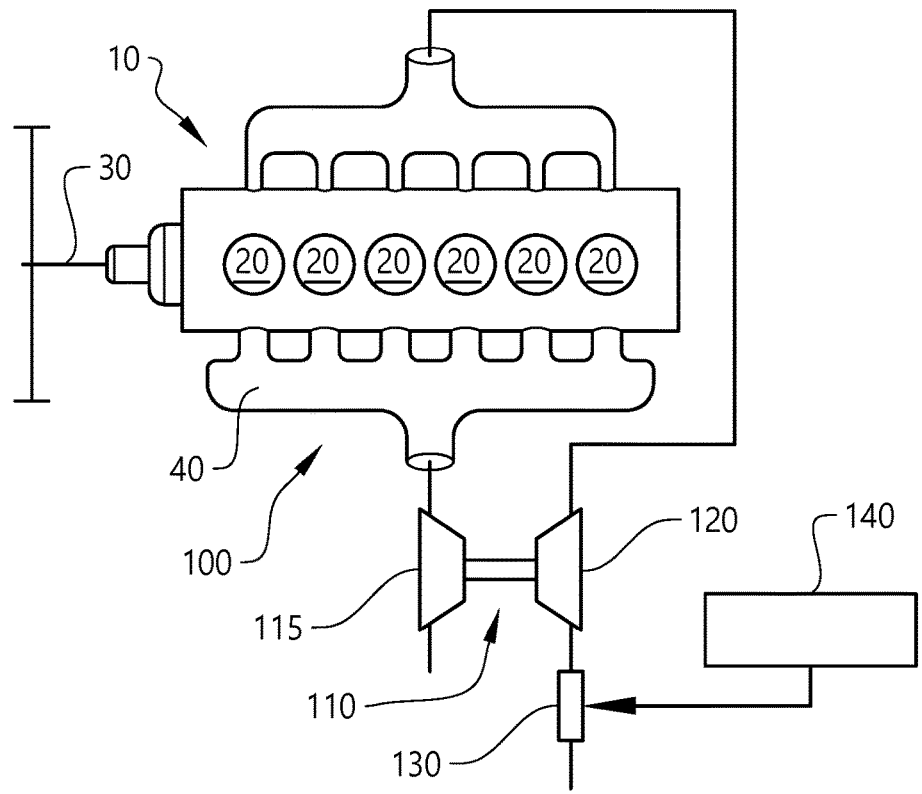
FIG. 2 is a schematic view of a vehicle system according to an embodiment.

As can be seen in FIG. 2 the internal combustion engine 10, such as a diesel engine, has a plurality of cylinders 20. Driving torque is generated by the reciprocal movement of pistons (not shown) enclosed in the cylinders 20, said pistons being connected to a crank shaft 30. As is well known in the art the crank shaft 30 is in turn coupled to a transmission.

A turbocharger 110 is also forming part of the vehicle system 100. The turbocharger 110 has a turbine 115 receiving exhaust gases from a manifold 40, which thereby starts to rotate. The turbine 115 is rotationally coupled to a compressor 120 which is receiving intake air and compresses the air before the air enters the cylinders 20.

The turbocharger 110 may be a fixed geometry turbocharger, which means that there is no possibility to adjust the swallowing capacity of the turbine 115. However, the turbocharger 110 may in some embodiments also be a variable geometry turbocharger.

A variable inlet guide vanes assembly 130 is arranged upstream the compressor 120 of the turbocharger 110. Hence fresh intake air flowing towards the compressor 120 will need to pass the variable inlet guide vanes assembly 130 before entering the compressor 120.

Figure 3A:
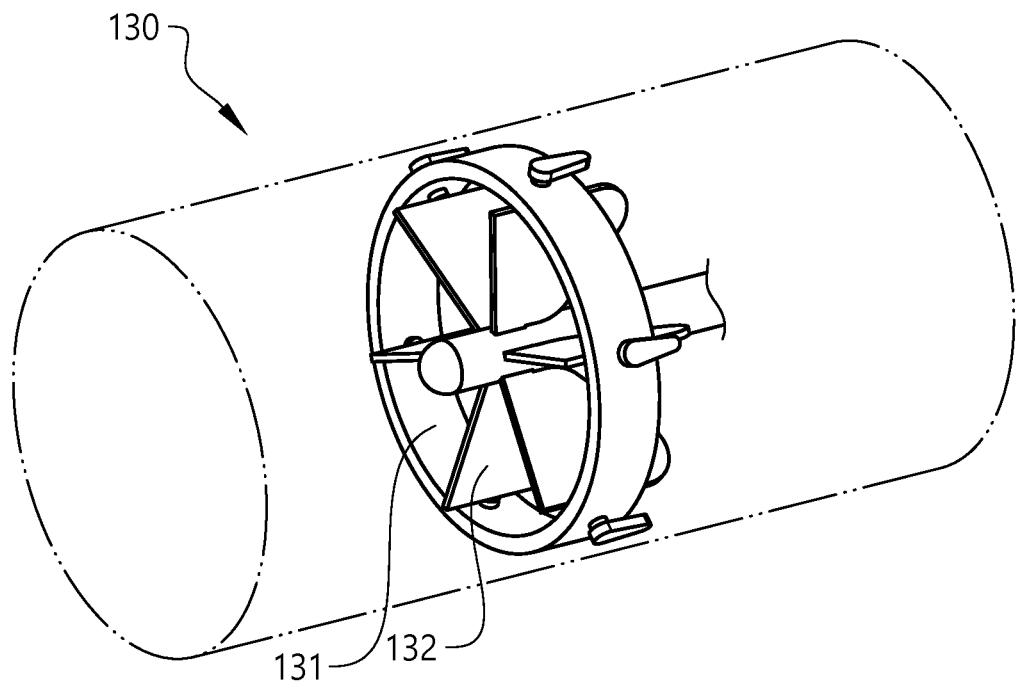
FIGS. 3a-d are views of a variable inlet guide vanes assembly forming part of a vehicle system according to an embodiment.
Figure 3B:
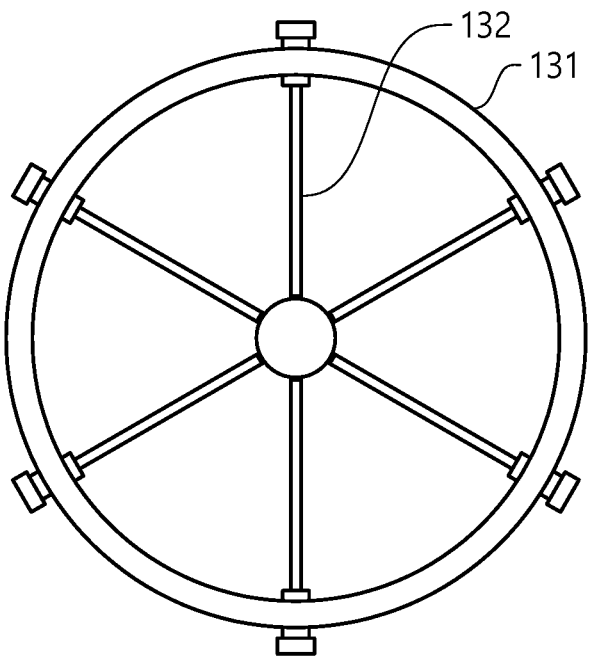
Figure 3C:
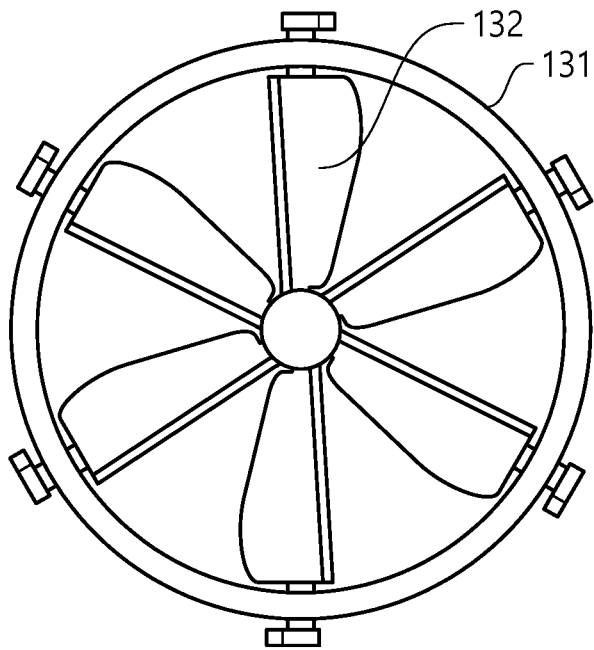
Figure 3D:
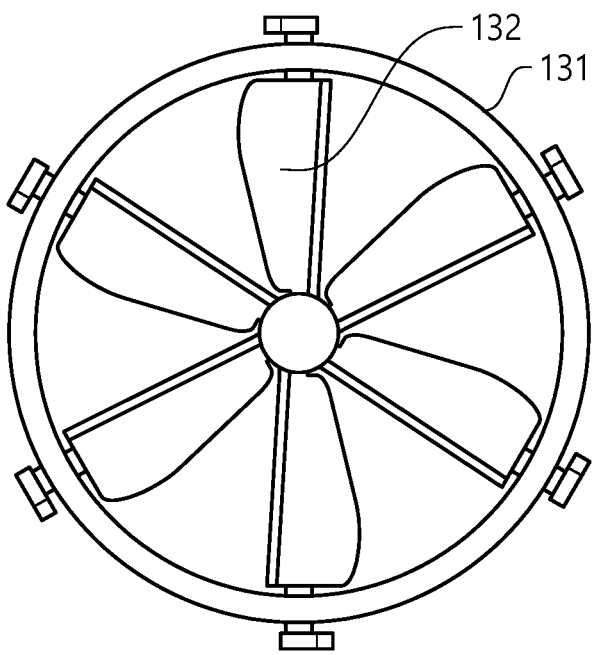

An example of a variable inlet guide vanes assembly 130 for use within the context of the present application is shown in FIGS. 3a-d. The variable inlet guide vanes assembly 130 comprises a flow channel 131 in which a number of vanes 132 is arranged. The number of vanes 132 could be selected depending on various criteria, and the present disclosure is not limited to the specific number of vanes 132 taught by FIGS. 3a-d. The position of the vanes 132 can be controlled by means of an actuator (not shown) being connected to a control unit 140 (see FIG. 2). Upon actuation the angle of the vanes 132 will be changed, either in a positive direction as is shown in FIG. 3c, or in a negative direction as is shown in FIG. 3d. As is readily understood the inclination angle of the vanes 132, which is equal for all vanes 132, can be set continuously and with a very high precision. It should further be noted that a neutral position, i.e. an inclination angle of V, corresponds to a position in which the vanes 132 cause minimum change in flow characteristics (see FIG. 3b).

The variable inlet guide vanes assembly 130 can be used to determine the angle of the inlet flow to the centrifugal compressor 120, i.e. modify the so called inlet velocity triangle, in order to extend the stable operating range by reducing or increasing the aerodynamic loading. A small to moderate pre-whirl in the same direction as the compressor 120 rotates (i.e. effected by means of a positive inclination angle of the vanes 132) reduces the loading which in turn results in reduced pressure ratio but, at the same time, improved isentropic efficiency towards the low flow region of a corresponding compressor map. A small pre-whirl in the opposite direction (i.e. effected by means of a negative inclination angle of the vanes 132) results in an increased loading which leads to a higher pressure ratio, especially towards the high flow region of the corresponding compressor map. It has been shown that some improvement of isentropic efficiency can be achieved in this high flow region but for the main part of the compressor map the efficiency decreases somewhat.

As will be further described with reference to FIG. 4, control of the inclination angle of the vanes 132 will in fact assist in minimizing engine derating of the vehicle system 100.

Figure 4:
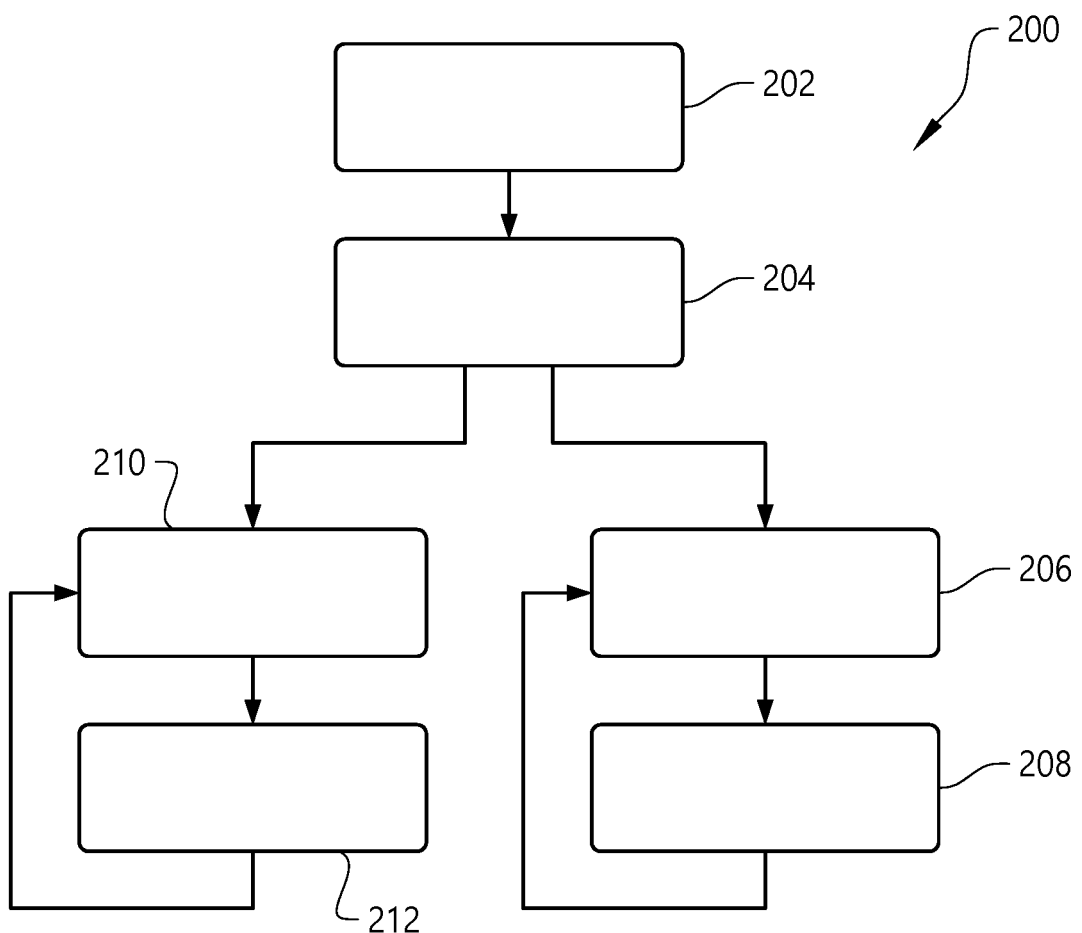
FIG. 4 is a schematic view of a method according to an embodiment.

Now turning to FIG. 4 a method 200 for optimizing engine derate, and especially high altitude margin, is shown. The method 200 is performed using a vehicle system 100 as described above, i.e. derating is minimized by controlling the inclination angle of the vanes 132 of the variable inlet guide vanes assembly 130.

As a general principle, the suggested method 200 is performed using a variable inlet guide vanes assembly 130 to either reduce the turbo speed or the exhaust temperature depending on the current operating condition of the vehicle system 100.

Different inclination angles of the vanes 132 will influence the compressor characteristics in terms of map width, efficiency and turbo speed differently based on where in the map the operating point is located as will be explained later with reference to FIGS. 5 and 6. Moreover, different effects on the compressor maps are seen depending on negative or positive inclination angles of the vanes 132.

As will be understood optimal combinations of engine settings such as fuel injection timing, position of an exhaust gas recirculation valve, the wastegate position, the position of the variable geometry turbine, etc. can also be determined for achieving minimized engine derating based on the effect compressor speed lines and efficiency have on the system.

In a first step 202 the method 200 detects if the vehicle system 100 is in a condition requiring engine derating. Such detection may typically be performed by determining a situation like high altitude driving, high ambient temperature, or high air humidity. In a subsequent step 204, the method is configured to determine certain driving characteristics, or operational conditions, normally requiring engine derating. Such operational condition may e.g. be either high engine speed or high engine torque.

If high torque is determined, the method 200 proceeds to step 210 in which an optimal positive inclination angle of the vanes 132 of the variable inlet guide vanes assembly 130 is determined.

At high engine torque the exhaust gas temperature is normally the limiting factor. This may be further explained by turning to FIG. 5 showing a compressor map. The dashed lines represent an inclination angle of 0°. At high engine torque, which corresponds to a low massflow through the compressor 120, the operating point of the compressor is located on the left side in the compressor map closer to surge.

Step 210 may further comprise identifying the optimal wastegate or variable geometry turbine position (if available) based on e.g. turbo speed, exhaust temp, ambient pressure, boost pressure, the position of the exhaust gas recirculation valve (if available) and brake specific fuel consumption using physical or numerical speed sensor and the already existing sensors on the engine.

From step 210 the method 200 will proceed to a step 212 of changing the inclination angle of the vanes 132 of the variable inlet guide vanes assembly 130 in order to reduce the exhaust gas temperature. Considering the compressor map, this is done increasing the compressor efficiency which leads to a higher air flow or lambda through the compressor 120.

Figure 5:
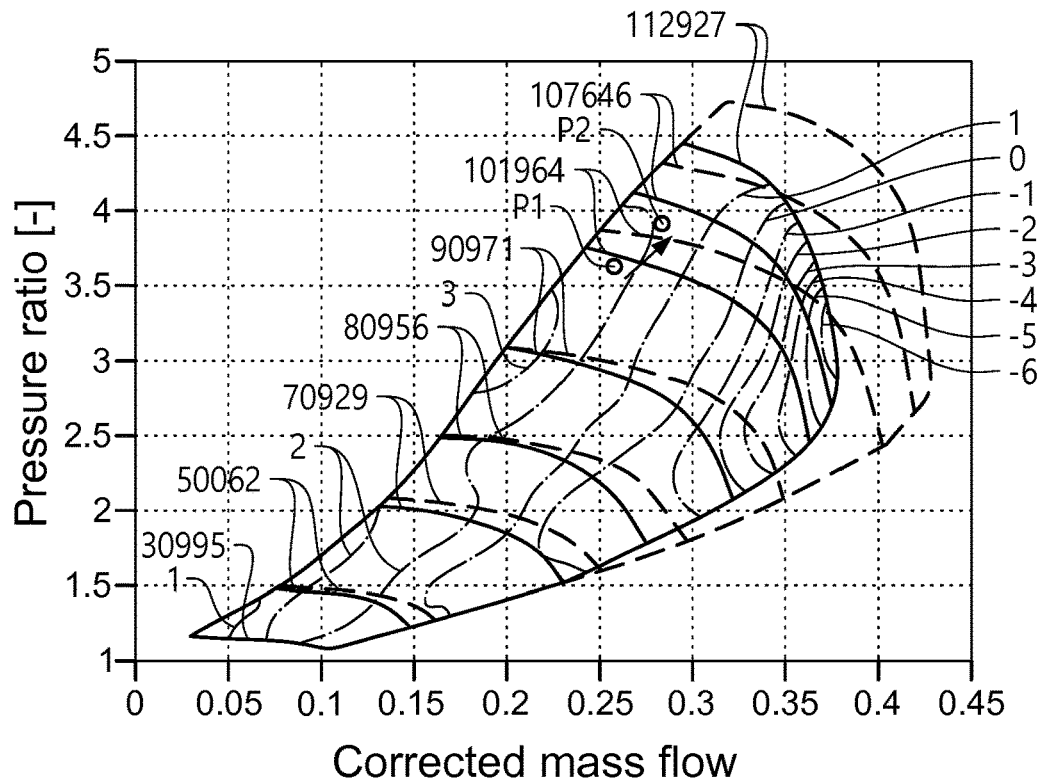
FIG. 5 is a diagram showing a compressor map when the variable inlet guide vanes assembly is in a neutral position, as well as in a positively inclined position.

By using different levels of positive inclination angles the compressor efficiency will actually be increased (see FIG. 5). In FIG. 5 as well as in FIG. 6 the iso islands represent the delta efficiency in relation to a neutral compressor map. While the dashed lines form the compressor map using an inclination angle of 0°, the solid lines form the compressor map when the inclination angle of the vanes 132 of the variable inlet guide vanes assembly is +20°. The operating point P1 represents the operating point when it is determined to increase the compressor efficiency. By moving the vanes 132 of the variable inlet guide vanes assembly 130 to +20° the operating point P1 will now be located in the respective compressor map (solid lines). As is evident the compressor efficiency is immediately increased as P1 is now located on an efficiency island having a higher value.

Other positive inclination angles between 0 and +20 will give different variation of the speed lines and efficiency levels; this means that different combinations of inclination angle, engine settings, wastegate settings (or variable geometry turbo settings) will provide efficient means for optimizing the method 200.

Again referring to FIG. 5, since the turbocharger unit 110 and the engine 10 is a strongly connected and dependent system, changing the compressor characteristics by means of the variable inlet guide vanes assembly 130 will as a secondary effect move the operating point P1 in the map to a new point P2. The compressor speed will increase by both the relative movement of the speed lines and the increased boost, but normally the margin in compressor speed for high torque and low engine speed operating points is sufficiently high.

Steps 210 and 212 may be repeated until the optimal setting is found; where eventually some other requirement, as exhaust temperature or soot, becomes the limiting factor. This is due to the fact that less intake air gives lower lambda that increases exhaust temperature and soot.

If high speed is determined, the method 200 proceeds to step 206 in which an optimal negative inclination angle of the vanes 132 of the variable inlet guide vanes assembly 130 is determined.

At high engine speed, which also is an indication of high power, the compressor speed is normally the limiting factor. This may be further explained by turning to FIG. 6 showing a compressor map. The dashed lines represent an inclination angle of 0°. At high engine speed, which corresponds to a high massflow through the compressor 120, the operating point of the compressor is located on the right side in the compressor map closer to choke.

Step 206 may further comprise identifying the optimal wastegate or variable geometry turbine position (if available) based on e.g. turbo speed, exhaust temp, ambient pressure, boost pressure, the position of the exhaust gas recirculation valve (if available) and brake specific fuel consumption using physical or numerical speed sensor and the already existing sensors on the engine.

From step 206 the method 200 will proceed to a step 208 of changing the inclination angle of the vanes 132 of the variable inlet guide vanes assembly 130 in order to decrease the compressor speed. Considering the compressor map, this is done by moving the speed lines up relative an equivalent map point resulting in a lower physical compressor speed, or by lowering the compressor efficiency.

Figure 6:
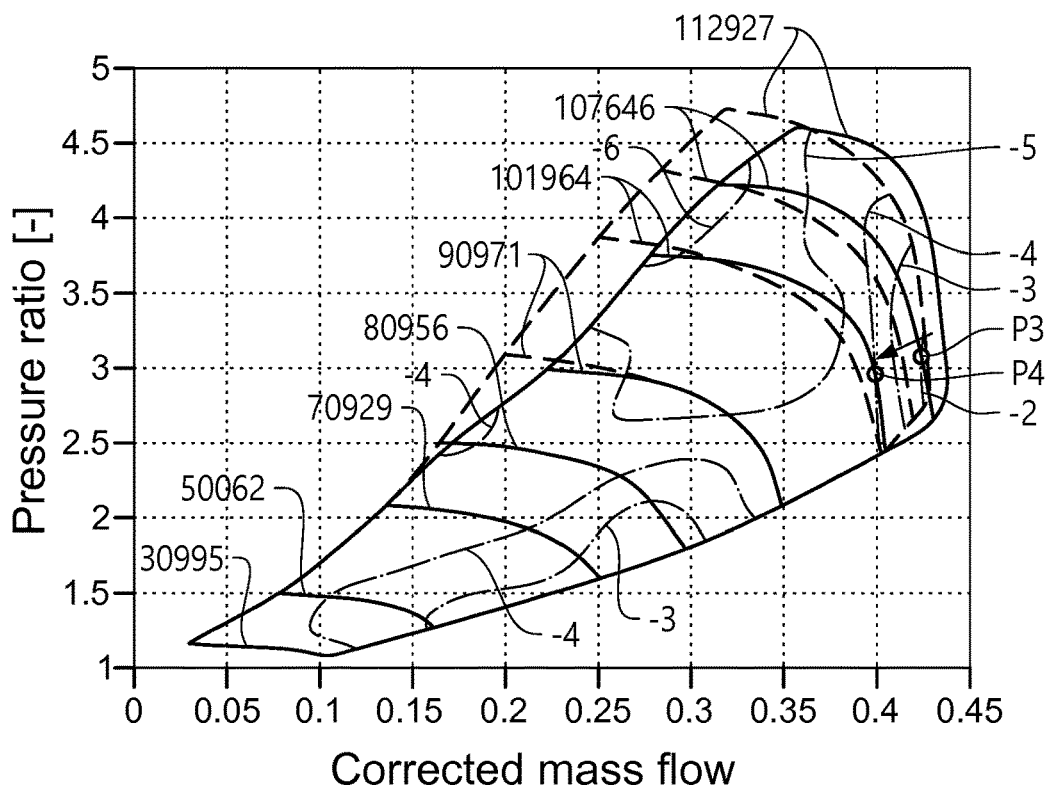
FIG. 6 is a diagram showing a compressor map when the variable inlet guide vanes assembly is in the neutral position, as well as in a negatively inclined position.

By using different levels of negative inclination angles the compressor speed will actually be reduced (see FIG. 6). While the dashed lines form the compressor map using an inclination angle of 0°, the solid lines form the compressor map when the inclination angle of the vanes 132 of the variable inlet guide vanes assembly is −20°. The operating point P3 represents the operating point when it is determined to reduce the compressor speed.

By moving the vanes 132 of the variable inlet guide vanes assembly 130 to −20° the operating point P3 will now be located in the respective compressor map (solid lines). As is evident the compressor speed is immediately starting to reduce as P3 is now located on a speed line having a lower value.

Other negative inclination angles between 0 and −20 will give different variation of the speed lines and efficiency levels; tests have shown that e.g. at −5° the efficiency will actually increase with around 1%. This means that different combinations of inclination angle, engine settings, wastegate settings (or variable geometry turbo settings) will provide efficient means for optimizing the method 200.

Again referring to FIG. 6, since the turbocharger unit 110 and the engine 10 is a strongly connected and dependent system, changing the compressor characteristics by means of the variable inlet guide vanes assembly 130 will as a secondary effect move the operating point P3 in the map to a new point P4. A reduction of the compressor efficiency will consequently lower the boost pressure and hence the mass-flow and pressure ratio will decrease as is shown in FIG. 6. In P4, new values of both efficiency and compressor speed are provided.

From FIG. 6 it is clearly visible that the compressor speed margin has increased which allows for the possibility to increase the amount of fuel and hence the engine power. Steps 206 and 208 can be repeated to iterate the improvement of compressor characteristics so that engine derating is minimized. This means that moving the operating point from P3 to P4 may be made by several repetitions of steps 206 and 208, thus indicating the several intermediate points exist between P3 and P4. It should be noted as when amount of fuel increases (as well as engine power) the operating point will move upwards and to the right in the compressor map.

Steps 206 and 208 may be repeated until the optimal setting is found; where eventually some other requirement, as exhaust temperature or soot, becomes the limiting factor. This is due to the fact that less intake air gives lower lambda that increases exhaust temperature and soot.

The diagrams of FIGS. 5 and 6 show experimental data, i.e. measured values mapped to show the effect different inclination angles of the vanes 132 of the variable inlet guide vane assembly 130 has on the compressor map. This data has been used to extrapolate turbo compressor maps, where two examples of maps with different inclination angles are exemplified (−20 and +20 deg). By knowing the compressor map for specific inclination angles, it is possible to determine a most suitable compressor map to control engine derating, and to change the inclination angle of the vanes 132 such that the selected compressor map is applied.

It should be noted that the two different routes presented above (steps 210-212 representing one route while steps 206-208 represent another route) can be combined such that the method first performs one route and thereafter the other route.

It is to be understood that the present invention is not limited to the embodiments described above and illustrated in the drawings; rather, the skilled person will recognize that many changes and modifications may be made within the scope of the appended claims.

It is to be understood that the present invention is not limited to the embodiments described above and illustrated in the drawings; rather, the skilled person will recognize that many changes and modifications may be made within the scope of the appended claims.

The invention claimed is:

1. A method of controlling engine derating of an internal combustion engine being provided with a turbocharger and a variable inlet guide vanes assembly arranged upstream from a compressor of the turbocharger, the method comprising:
   determining a current operational condition requiring engine derating,
   detecting a current operational condition of the compressor, and
   controlling a position of the variable inlet guide vanes assembly based on the detected operational condition of the compressor, wherein:
      if the detected current operational condition of the compressor is indicative of high engine speed and high power, controlling the position of the variable inlet guide vanes assembly to a negative inclination angle for a pre-whirl in an opposite direction as the compressor to reduce compressor speed, and
      if the detected current operational condition of the compressor is indicative of high engine torque and low engine speed, controlling the position of the variable inlet guide vanes assembly to a positive inclination angle for a pre-whirl in a same direction as the compressor to reduce exhaust gas temperature.

2. The method according to claim 1, wherein determining the current operational condition requiring engine derating is performed by detecting high altitude driving.

3. The method according to claim 1, wherein controlling the position of the variable inlet guide vanes assembly is performed by determining an estimated negative inclination angle for the vanes of the variable inlet guide vanes assembly, and changing the inclination of the vanes to the determined negative inclination angle.

4. The method according to claim 3, wherein the estimated negative inclination angle of the vanes is between 0 and negative 45°.

5. The method according to claim 3, wherein detecting a current operational condition of the compressor and controlling the position of the variable inlet guide vanes assembly are repeated.

6. The method according to claim 1, wherein controlling the position of the variable inlet guide vanes assembly is performed by determining an estimated positive inclination angle for the vanes of the variable inlet guide vanes assembly, and changing the inclination of the vanes to the determined positive inclination angle.

7. The method according to claim 6, wherein the estimated positive inclination angle of the vanes is between 0 and 45°.

8. The method according to claim 6, wherein detecting a current operational condition of the compressor and controlling the position of the variable inlet guide vanes assembly are repeated.

9. The method according to claim 1, wherein detecting a current operational condition of the compressor is performed by determining a current corrected mass flow through the compressor and a current pressure ratio across the compressor.

10. A vehicle system comprising an internal combustion engine, a turbocharger, a variable inlet guide vanes assembly arranged upstream from a compressor of the turbocharger, and a control unit being connected to the variable inlet guide vanes assembly and configured to:
   determine a current operational condition requiring engine derating,
   detect a current operational condition of the compressor, and control a position of the variable inlet guide vanes assembly based on the detected operational condition of the compressor, wherein:
  if the detected current operational condition of the compressor is indicative of high engine speed and high power, controlling the position of the variable inlet guide vanes assembly to a negative inclination angle for a pre-whirl in an opposite direction as the compressor to reduce compressor speed, and
  if the detected current operational condition of the compressor is indicative of high engine torque and low engine speed, controlling the position of the variable inlet guide vanes assembly to a positive inclination angle for a pre-whirl in a same direction as the compressor to reduce exhaust gas temperature.

11. For controlling engine derating of an internal combustion engine being provided with a turbocharger and a variable inlet guide vanes assembly arranged upstream from a compressor of the turbocharger, a non-transitory computer-readable storage medium comprising a computer program product including instructions to cause at least one processor to:

determine a current operational condition requiring engine derating, detect a current operational condition of the compressor, and control a position of the variable inlet guide vanes assembly based on the detected current operational condition of the compressor, wherein:
  if the detected current operational condition of the compressor is indicative of high engine speed and high power, controlling the position of the variable inlet guide vanes assembly to a negative inclination angle for a pre-whirl in an opposite direction as the compressor to reduce compressor speed, and
  if the detected current operational condition of the compressor is indicative of high engine torque and low engine speed, controlling the position of the variable inlet guide vanes assembly to a positive inclination angle for a pre-whirl in a same direction as the compressor to reduce exhaust gas temperature.

* * * * *